United States Patent [19]
Tarrillo et al.

[11] Patent Number: 6,055,162
[45] Date of Patent: Apr. 25, 2000

[54] SELF-OSCILLATING DC-DC CONVERTER APPARATUS AND METHOD ESPECIALLY ADAPTABLE FOR VHF OPERATION

[75] Inventors: Albert G. Tarrillo, Silver Spring, Md.; Dennis Schaefer, Middletown, Ohio; Scott K. Suko, Elkridge; Edward L. Rich, III, Arnold, both of Md.; Keith L. Rowe, Cincinnati, Ohio

[73] Assignee: Northrop Grumman Corporation, Los Angeles, Calif.

[21] Appl. No.: 09/041,213

[22] Filed: Mar. 12, 1998

[51] Int. Cl.[7] .......................... H02M 3/335; H02M 7/538
[52] U.S. Cl. .............................................. 363/25; 363/133
[58] Field of Search .................................. 363/24, 25, 55, 363/56, 131, 133, 134

[56] References Cited

U.S. PATENT DOCUMENTS

| | | |
|---|---|---|
| 4,605,999 | 8/1986 | Bowman et al. . |
| 4,685,041 | 8/1987 | Bowman et al. . |
| 4,845,605 | 7/1989 | Steigerwald . |
| 4,890,214 | 12/1989 | Yamamoto ................................ 363/25 |
| 4,899,271 | 2/1990 | Seiersen . |
| 4,980,810 | 12/1990 | McClanahan et al. . |
| 5,218,522 | 6/1993 | Phelps et al. ............................. 363/24 |
| 5,729,444 | 3/1998 | Perol ........................................ 363/25 |
| 5,883,793 | 3/1999 | Farrington ................................ 363/25 |

*Primary Examiner*—Matthew Nguyen

[57] ABSTRACT

A DC-DC voltage converter 40, which is adaptable to VHF operation, has a power oscillator 52 to which a filtered input DC voltage 50 is applied for conversion to an output DC voltage. The power oscillator includes a push-pull amplifier 58, 60 and an impedance transformation circuit 62 to which the amplifier is connected. The power oscillator also includes a rectifier circuit 64 which is connected to the impedance transformation circuit. A feedback circuit 68 controls the frequency of the oscillator to regulate the output DC voltage. The oscillator frequency depends on the impedance values of oscillator circuit components and the values of a plurality of oscillator component intrinsic parameters.

24 Claims, 8 Drawing Sheets

SELF-OSCILLATING DC-DC CONVERTER APPARATUS AND METHOD ESPECIALLY ADAPTABLE FOR VHF OPERATION

BACKGROUND OF THE INVENTION

The present invention relates to power conversion circuitry and circuit operating methods, and, more particularly, to circuitry which can operate at very high frequency (VHF) in converting a DC voltage from one level to another level.

Radio frequency (RF) circuitry and digital circuitry have increasingly employed integrated circuits and other microcircuits to reduce apparatus size and weight while providing reliable operation with necessary and desired functioning. As a result, lower DC supply voltages have been needed, but, in many conventional power supply systems such as those in radar circuitry, large DC current distribution is associated with such lower DC voltages. In turn, large currents produce significant voltage drops across power transmitting conductors in the power distribution system, thereby imposing a requirement for greater conductor sizes and weights and complicating the process of achieving DC voltage regulation accuracy.

As disclosed in a commonly assigned patent application entitled PULSED RADAR APPARATUS AND METHOD EMPLOYING POWER DISTRIBUTION SYSTEM HAVING REDUCED COST AND WEIGHT AND ENHANCED EFFICIENCY AND RELIABILITY, Ser. No. 09/041,214, concurrently filed herewith by E. Rich and A. Tarrillo, and hereby incorporated by reference, a distributed power supply delivery system can provide an improved supply of low DC voltage power with use of a VHF DC-DC converter. In a distributed system, distributed power modules deliver power closer to the load point with higher voltage operation at higher levels of the system, thereby reducing the large current otherwise supplied by a central power supply.

In converting DC voltages to lower values in power supply systems, VHF switching, if available, can contribute significantly to reduction in the size and weight of the power supply system and the electronic circuitry associated with the power supply system. Further, communication products, characterized with sensitive data processing, have specifically needed higher (i.e. VHF) DC-DC voltage converter switching frequencies, since power supply operation with a frequency greater than the communication channel frequency minimizes noise/spur interference and eliminates stringent filter requirements.

VHF operation of a DC-DC voltage converter can reduce impedance magnitudes of passive circuit components, thereby reducing power distribution system and weight. Conventionally, parasitic elements of switching devices and other converter components have operated without contribution to circuit functioning and thus have had a limiting effect on the operating frequency capability of DC-DC converters. In turn, the achievable amount of power system size and weight reduction has been adversely affected. In addition, inefficient converter operation, due to prior switch drive techniques and to types of previously used magnetic components, has adversely affected the development of higher frequency operation of DC-DC converters in the VHF frequency range (VHF: 30–300 MHz).

Communication and radar electronic systems having sensitive data processing requirements further require power line signals with ultra-low (microvolt) noise and ripple. Power supplies, employing traditional pulse width modulation, employ switching of square voltage waveforms which have a high content of high frequency components. Accordingly, such power supplies require added shielding and filtering to obtain low-noise system performance.

Some prior-art efforts have been directed to providing VHF converter operation in power distribution systems. For example, in U.S. Pat. No. 4,980,810, entitled VHF DC-DC POWER SUPPLY OPERATING AT FREQUENCIES GREATER THAN 50 MHz and issued to R. McClanahan et al. on Dec. 25, 1990, a separate oscillator drives a single-ended amplifier circuit. An impedance transformation/isolation circuit couples the single-ended amplifier to an output rectifier circuit. A feedback signal controls preamplifier current to regulate the amplifier and the output voltage.

The McClanahan converter is directed to a radar system application and apparently provides frequency operation up to 50 MHz, and possibly higher. However, the DC-DC converter design employs a separate oscillator and a single-ended amplifier which drive the rest of the circuitry. In single-ended amplifier operation, a single switch cycles ON and OFF to provide a waveform for conversion to a different voltage level.

As such, the overall McClanahan circuit has undesirable inefficiencies, is adversely affected in frequency operation by parasitic circuit parameters, and requires components which are larger and heavier than desirable. Such components directly contribute to the size and weight of a power system in which the converter may be used. It is particularly noteworthy that the prior art single-ended converters are characteristically power level limited at higher frequencies due to inefficiencies encountered with higher frequency operation.

Another prior-art DC-DC converter employs a self-oscillating power train in which a single-ended amplifier is driven by an oscillator to provide high frequency operation but not VHF operation, as disclosed in a group of commonly assigned patents. These patents are perhaps best represented by U.S. Pat. No. 4,605,999, entitled SELF-OSCILLATING HIGH FREQUENCY POWER CONVERTER and issued to W. C. Bowman et al. on Aug. 12, 1986, and U.S. Pat. No. 4,685,041, entitled RESONANT RECTIFIER CIRCUIT and issued to W. C. Bowman et al. et al. on Aug. 4, 1987. As in the McClanahan disclosure, the Bowman single-ended converter is relatively power limited at higher frequencies due to the single-ended amplifier operation. Further, U.S. Pat. No. 4,485,605, entitled HIGH-FREQUENCY DC-DC POWER CONVERTER WITH ZERO VOLTAGE SWITCHING OF SINGLE PRIMARY-SIDE POWER DEVICE and issued to R. L. Steigerwald on Jul. 4, 1989, discloses a DC-DC converter, but, again, it is based on use of a single-ended amplifier.

In another U.S. Pat. No. 4,899,271 entitled POWER SUPPLY CIRCUIT and issued to O. S. Seiersen on Feb. 6, 1990, a power circuit is disclosed, but the disclosure of this patent is particularly directed to certain diode operating features and operates with high harmonic square waves and with adverse parasitic effects.

A need has thus existed for a better DC-DC converter, and particularly a VHF DC-DC converter, in which wider frequency operation can be achieved reliably and effectively with greater facility and with reduced converter size and weight.

SUMMARY OF THE INVENTION

The present invention employs DC-DC voltage converter circuitry which overcomes shortcomings of the prior art to enable wide frequency operation, including VHF operation and its associated benefits. The invention is directed to applying principles of self-oscillation to provide a DC-DC converter capable of operating in the VHF range. In accordance with the invention, a DC-DC converter comprises a power oscillator having a push-pull amplifier and an impedance transformation circuit connected to the amplifier. The oscillator also includes a rectifier circuit which is connected to the impedance transformation circuit to generate an output DC voltage from an input DC voltage applied to the oscillator. Circuitry responsive to the output DC voltage controls the oscillator frequency to regulate the output DC voltage. Preferably, the oscillator frequency is determined by component intrinsic parameter values and component impedance values.

BRIEF DESCRIPTION OF THE DRAWINGS

The accompanying drawings, which are incorporated in and constitute a part of this specification, illustrate a preferred embodiment of the invention and together with the description provide an explanation of the objects, advantages, and principles of the invention. In the drawings.

DESCRIPTION OF THE INVENTION

A DC-DC converter of the invention employs a self-oscillating, push-pull circuit which is capable of operation in a wide frequency range including the VHF range, and which permits the use of printed circuit components and stripline transformer technology eliminating magnetic core material to reduce costs and increase manufacturability. Very high frequency operation of a DC-DC converter of the invention reduces the energy storage time requirements of passive components and thereby the magnitudes of such components. A significant reduction in converter size and weight is thus achieved. Significantly, the invention enables efficient DC-DC converter operation at high power levels.

A DC-DC converter of the invention basically incorporates a power oscillator with input and output filters. The oscillator is self-oscillating and includes primary switching devices functioning in a push-pull driver, an impedance transformation/isolation circuit, and a rectification circuit. Intrinsic or parasitic impedance values and impedance values, associated with components in these circuits, contribute to resonant oscillator operation.

In this operation, resonant tank elements produce near-sinusoidal currents in the circuitry. As such, the converter is relatively free of harmonic currents.

A regulation signal is applied from the rectifier output to drive and control circuitry which includes base or gate connections of the primary switching devices. In addition to other described benefits, the invention generally reduces converter complexity and the number of converter parts.

Figure 1:
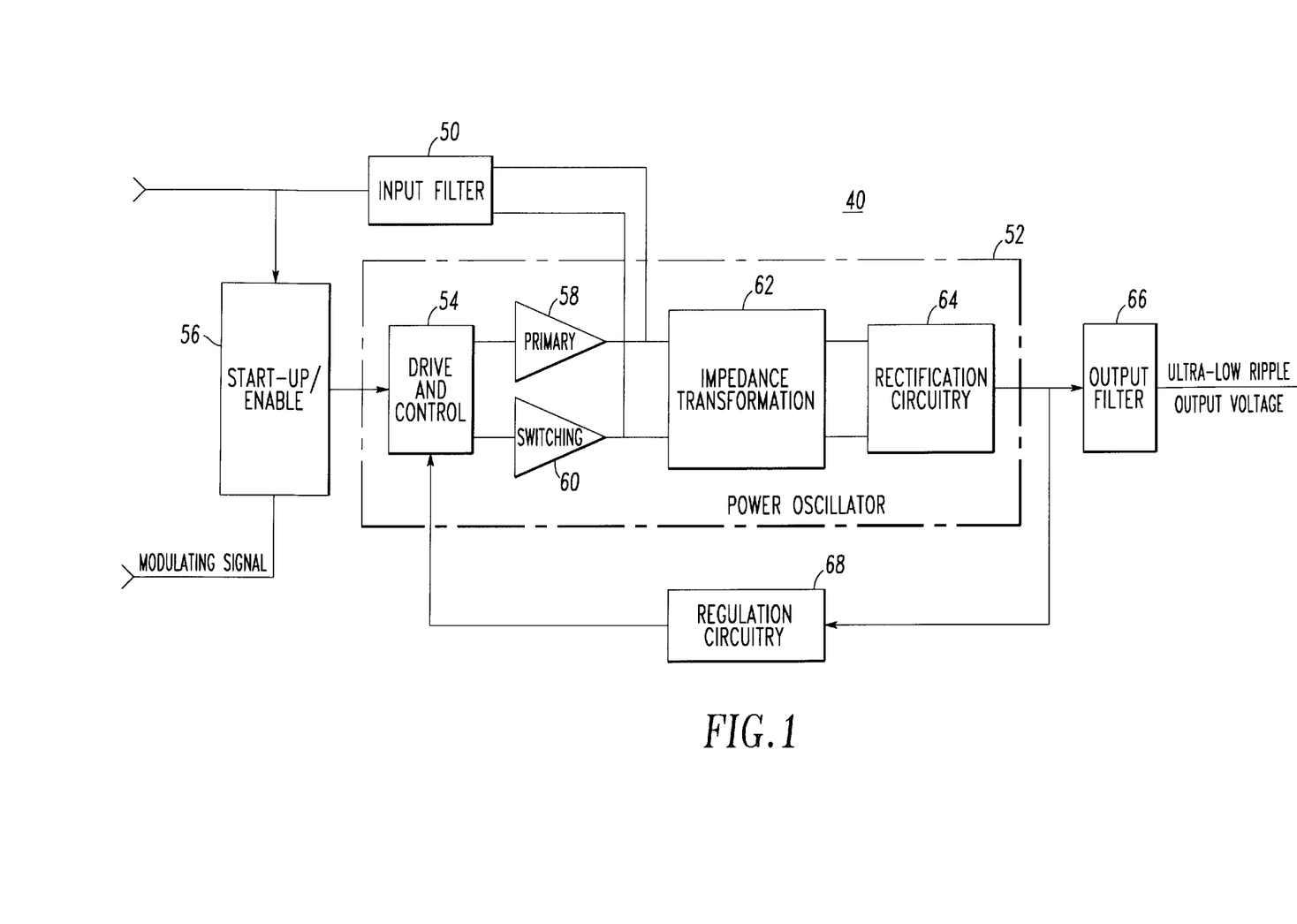
FIG. 1 is a circuit block diagram of a self-oscillating, push-pull DC-DC converter structured in accordance with the invention for connection in a power distribution system.

More particularly, a self-oscillating, push-pull DC-DC converter 40 is structured in accordance with the invention as shown in the circuit block diagram in FIG. 1. The converter 40 includes a push-pull oscillator 52 which self-oscillates, in this case in the VHF range, to convert a first level DC voltage to a second level DC voltage.

In this instance, the first level voltage is a higher level voltage and the second level voltage is a lower level voltage. As an example, in a distributed power delivery system such as that described in the referenced 1215–301P patent application, the higher level voltage can be an intermediate level voltage in the power delivery system.

The DC-DC VHF converter 40 operates in the VHF frequency range, thereby enabling the described VHF benefits to be realized. However, as already indicated, the converter 40 can be designed to operate at lower and higher frequencies with similar benefits. As a lower frequency example, the converter 40 has been arranged in one practical embodiment to operate effectively in the HF (high frequency) range.

An input filter 50 receives an input DC voltage and attenuates any AC signals to block them from entry to a power oscillator 52. The filter output DC current is supplied to the power train of the power oscillator 52.

In the power oscillator 52, a drive and control circuit 54 is gate enabled at relatively low signal levels by a start-up/enable circuit indicated by block 56. Start-up circuitry within the block 54 initially biases enable, regulation, and control circuitry in preparation for receiving an enable signal from an external control such as a radar array computer (not shown).

The enable signal turns the oscillator 52 and the VHF converter 40 ON and OFF, and the enable signal on/off rate determines the converter output pulse repetition frequency (PRF). The converter enablement or ON/OFF modulation operation of the invention at low signal levels is advantageous as contrasted with modulation of a converter at the high power levels of the primary switch paths.

The voltage amplitude of the converter output pulses, which can be applied as RF modulating pulses in a radar system, is predetermined by application requirements reflected in the VHF converter design.

The drive and control circuit 54 is coupled to primary switching elements 58 and 60 which drive the power train of the converter. When one switch is open, the other switch is closed. These switches are driven by a resonant tank within the oscillator 52, operate 180 degrees out of phase, and basically chop the input DC voltage to an AC signal for transforming to a signal of desired level which is rectified back to DC.

The switch outputs are connected to an impedance transformer 62 which can provide DC isolation. An alternating signal from the transformer 62 is connected to a rectifier 64. The impedance transformer 62 can be a conventional transformer or a distributed impedance transformer as described elsewhere herein.

A converted DC voltage is connected from the rectifier 64 to an output filter 66 which supplies converter output DC voltage, having ultra-low ripple and being usable as drain pulse power for ASEA RF amplifiers. The filter 66 thus substantially attenuates AC signals from the converter output.

Feedback regulation circuitry 68 samples the output DC voltage and develops a corrective control signal which is applied to the drive and control circuit 54 to adjust the oscillator frequency as needed to maintain a set amplitude for the converter DC voltage at the output of the output filter 64.

In regulating the converter operating frequency, the regulation circuit 68 feeds a DC error signal to the control circuit 54 to vary the operating frequency. The operating frequency for DC-DC converters, in the embodiments described herein, is in the MHz range, as contrasted with radar frequencies which are in the GHz range. In radar applications, the modulating pulse repetition rate (PRF), produced under array computer control, would usually be in the hundred Hz or KHz range.

Figure 2:
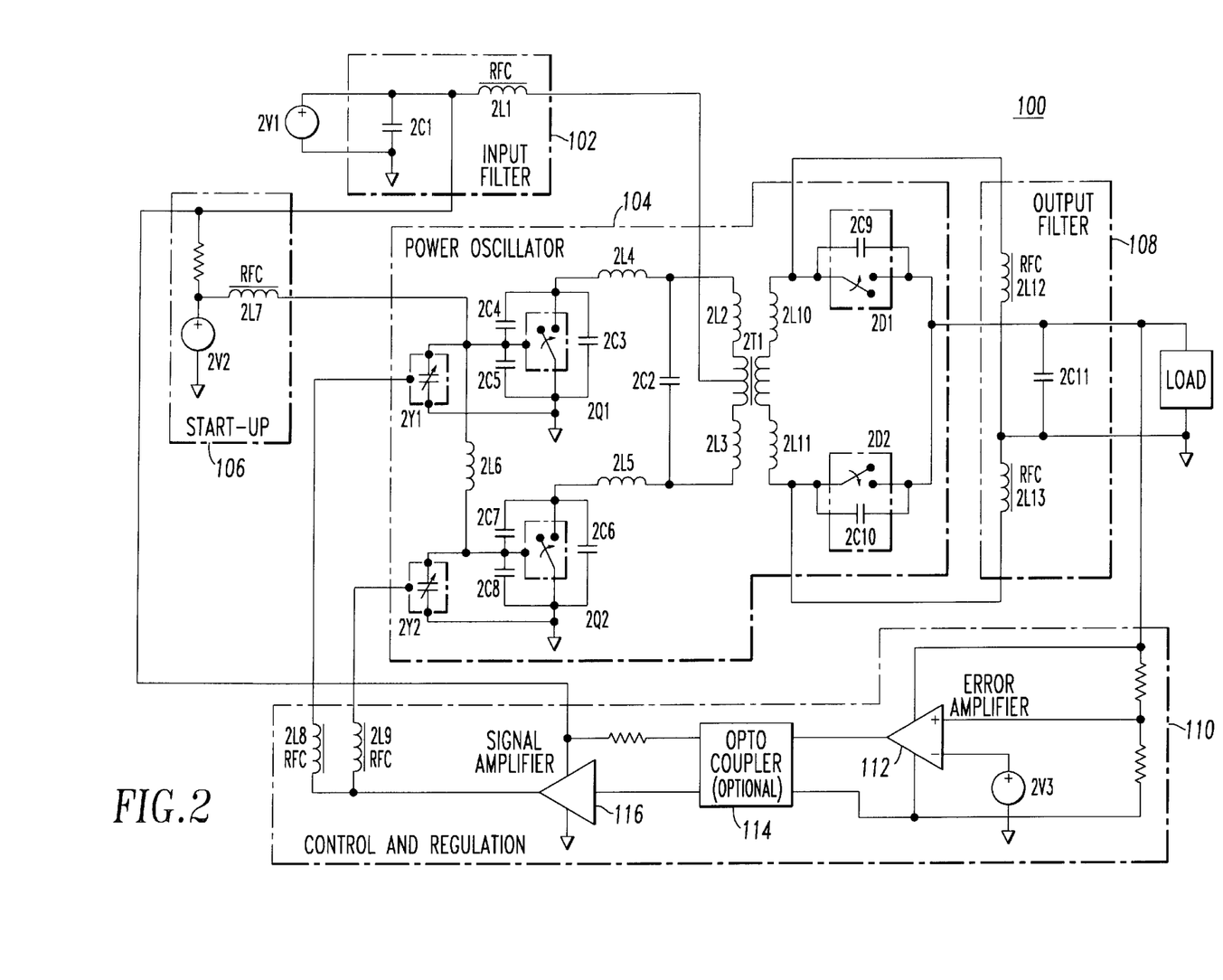
FIG. 2 is a schematic diagram of a generalized DC-DC converter circuit in which the basic principles of the invention are applied.

FIG. 2 shows a schematic diagram of a self-oscillating DC-DC converter circuit 100 arranged in accordance with the invention to be especially suitable for VHF operation. As previously indicated, a need exists to increase DC-DC voltage converter switching frequencies to enable and/or facilitate VHF operation and thereby reduce the parameter magnitudes of converter passive components and the converter size and weight. Previously, parasitic elements of circuit components have adversely affected the facility with which VHF and wider frequency operation might be provided for conversion in DC power supplies. Further, inefficient converter operation, due to the use of prior switch drive techniques and conventional magnetic components, has adversely affected the operation of DC-DC converters especially in the VHF range.

The VHF converter 100 provides efficient VHF switching operation as a result of resonant switch drive and self-oscillation. The VHF converter structure enables use of printed and stripline components which eliminate magnetic materials. VHF operation is obtained with the parasitic elements of all components, such as capacitive switching time constants and rectification device parasitics, operating as functional contributors to self-oscillation.

Specifically, the self-oscillating DC-DC VHF converter 100 includes an input filter 102, a power oscillator 104, start-up circuitry 106, an output filter 108, and control/regulation subcircuitry 110. 2V1 is an input DC voltage to be converted to an output DC voltage. The input filter 102 includes a capacitor 2C1 and an inductor 2L1 which operates as an RF choke. The input filter 102 provides an AC signal block which prevents emission of DC ripple.

The power oscillator 104 includes a distributed L-C equivalent circuit or tank. The elements of the power oscillator 104 thus provide a resonant bandpass function. Intrinsic elements of the active components, otherwise considered parasitic elements in conventional power conversion techniques, are utilized as functional elements in the self-oscillating structure of the invention. Step-up or step-down voltage transformation can be provided by the combination of element transformer 2T1 and the resonant impedance matching tuning of the distributed L-C tank.

A primary side of the self-oscillating DC-DC converter 100 includes the primary side of the transformer 2T1. Inductors 2L2 and 2L3 represent leakage and lead inductance of the primary side.

The primary side reactance is reflected to the secondary of the transformer 2T1 which includes secondary leakage and lead inductance 2L10 and 2L11. The combined primary reactance along with intrinsic rectifier capacitance 2C9 and 2C10 form one leg of the distributed L-C tank. The currents through rectifying devices 2D1 and 2D2, in the push-pull configuration of the invention, are 180° out of phase (see FIG. 8).

Figure 4:
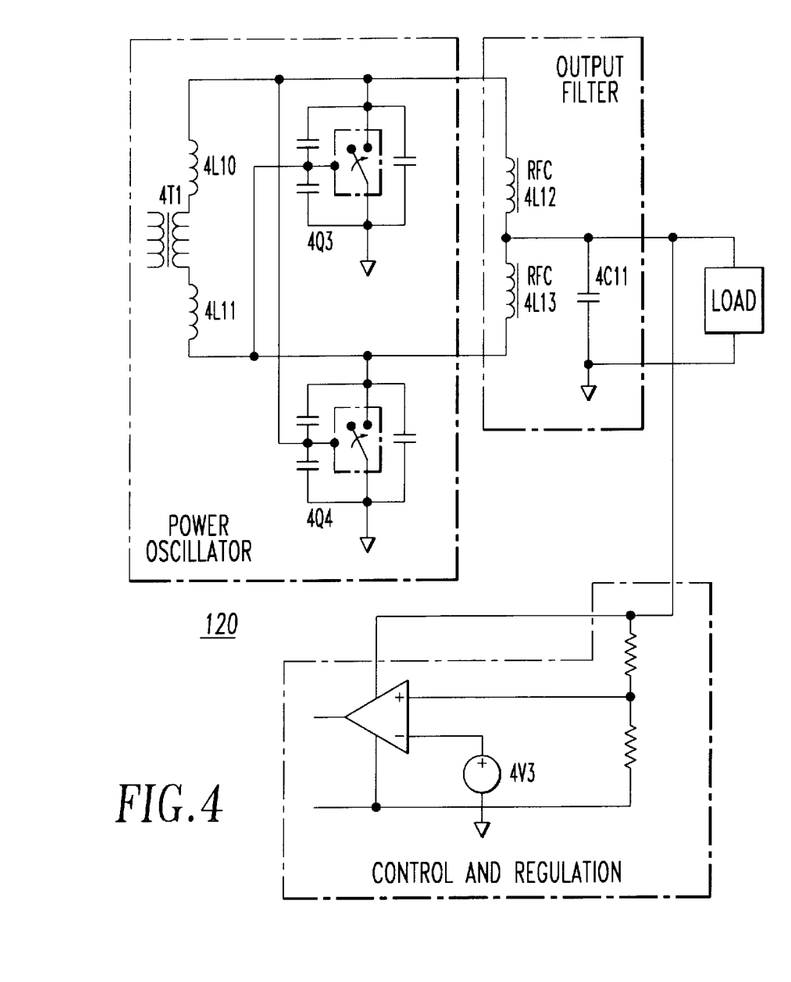

An alternative rectification circuit of the invention, based on synchronous rectifying principles, is included in a portion of a self-oscillating converter 120 shown in FIG. 4.

With reference again to FIG. 2, a primary side capacitor 2C2 and inductors 2L4 and 2L5 along with the combined switch intrinsic capacitance 2C3, 2C4, 2C6, and 2C7 form the other leg of the power train distributed L-C tank. The described resonant elements operate together to produce sinusoidal currents throughout the converter circuitry.

Figure 7:
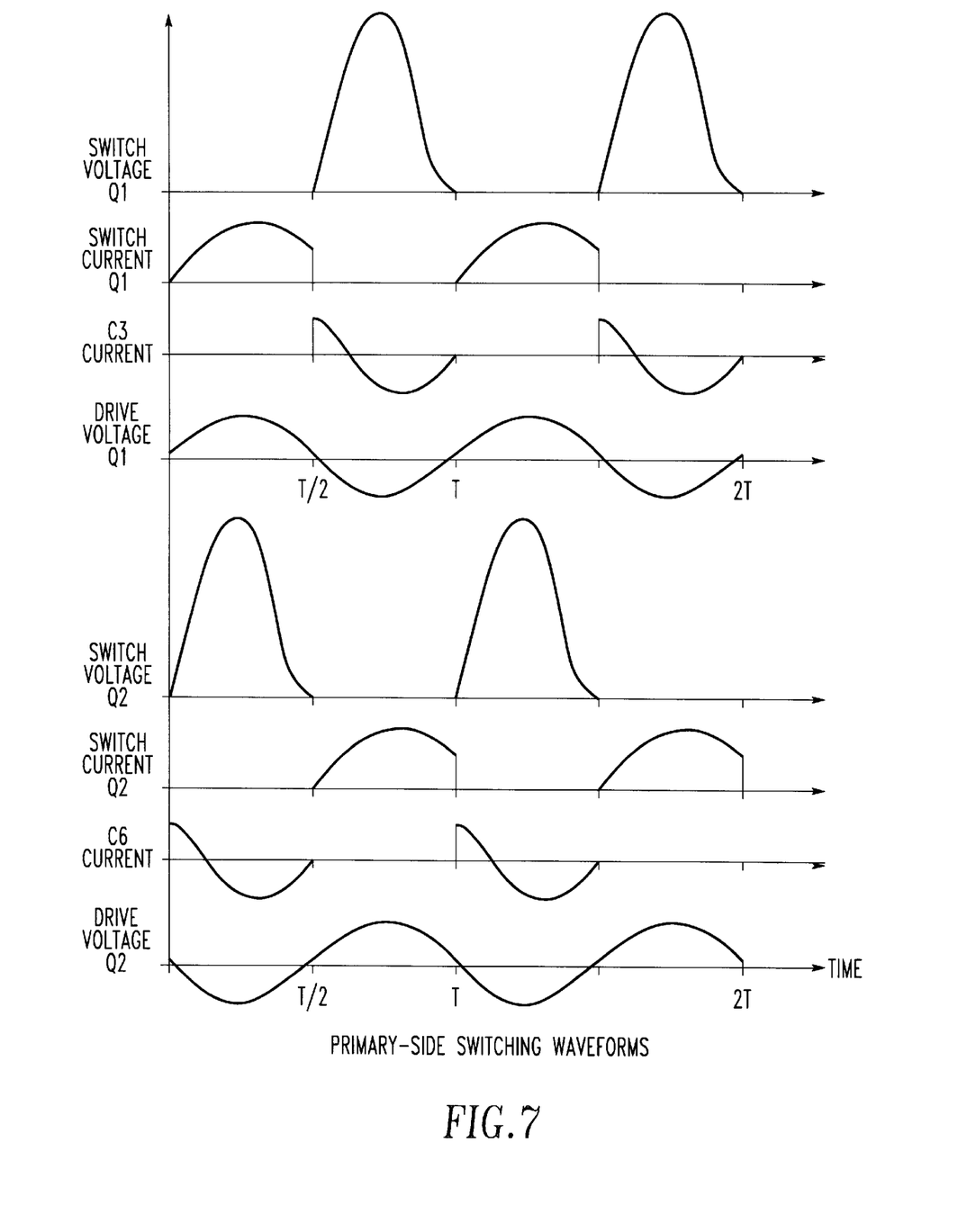
FIGS. 7 AND 8 respectively represent switching waveforms on primary and secondary transformer sides in the embodiment of FIG. 2.

The currents through switching devices 2Q1 and 2Q2, in the push-pull configuration of FIG. 2 are 180° out of phase (FIG. 7). When one switch is closed and conducting current, the other switch is open with its shunt capacitor conducting current.

The push-pull switches 2Q1 and 2Q2 drive the power train of the DC-DC converter 100. The switches 2Q1 and 2Q2 are in turn driven by a resonant tank consisting of intrinsic switch capacitance 2C5 and 2C8 and switch inductor 2L6. Capacitors 2C4 and 2C7 provide switch electrical feedback to self-oscillate the power train.

Start-up circuitry provides a bias ramp which triggers initial oscillation. The ramp characteristics are set by inductor 2L7 and switch capacitances 2C5 and 2C8. Inductor 2L6 provides a sufficient delay to begin migration to 180° phase drive. Proper gain is supplied in the power train circuitry so that the described soft startup occurs for all load variations and significant input voltage range.

2L12 and 2L13 are RF chokes which provide AC signal isolation. The output filter 108 includes capacitor 2C11 for additional output DC ripple attenuation. The DC-DC converter 100 appears as a DC current source to the load.

With the use of current doubler circuitry, i.e., a choke splits into two chokes, current is doubled without stressing the transformer 2T1.

Further, the DC-DC converter 100 achieves output voltage regulation by varying the switching frequency in relation to the fixed tuning of the resonant power train tank. Varactors (voltage controlled variable capacitors) 2Y1 and 2Y2 are placed in shunt with the switch capacitance 2C5 and 2C8 to vary the switching frequency. The varactors 2Y1 and 2Y2 are contributors to drive tank tuning along with the inductor 2L6. The implementation of the invention in FIG. 2 is a series-resonant/parallel-loaded resonant converter especially effective for step-down applications.

Figure 8:
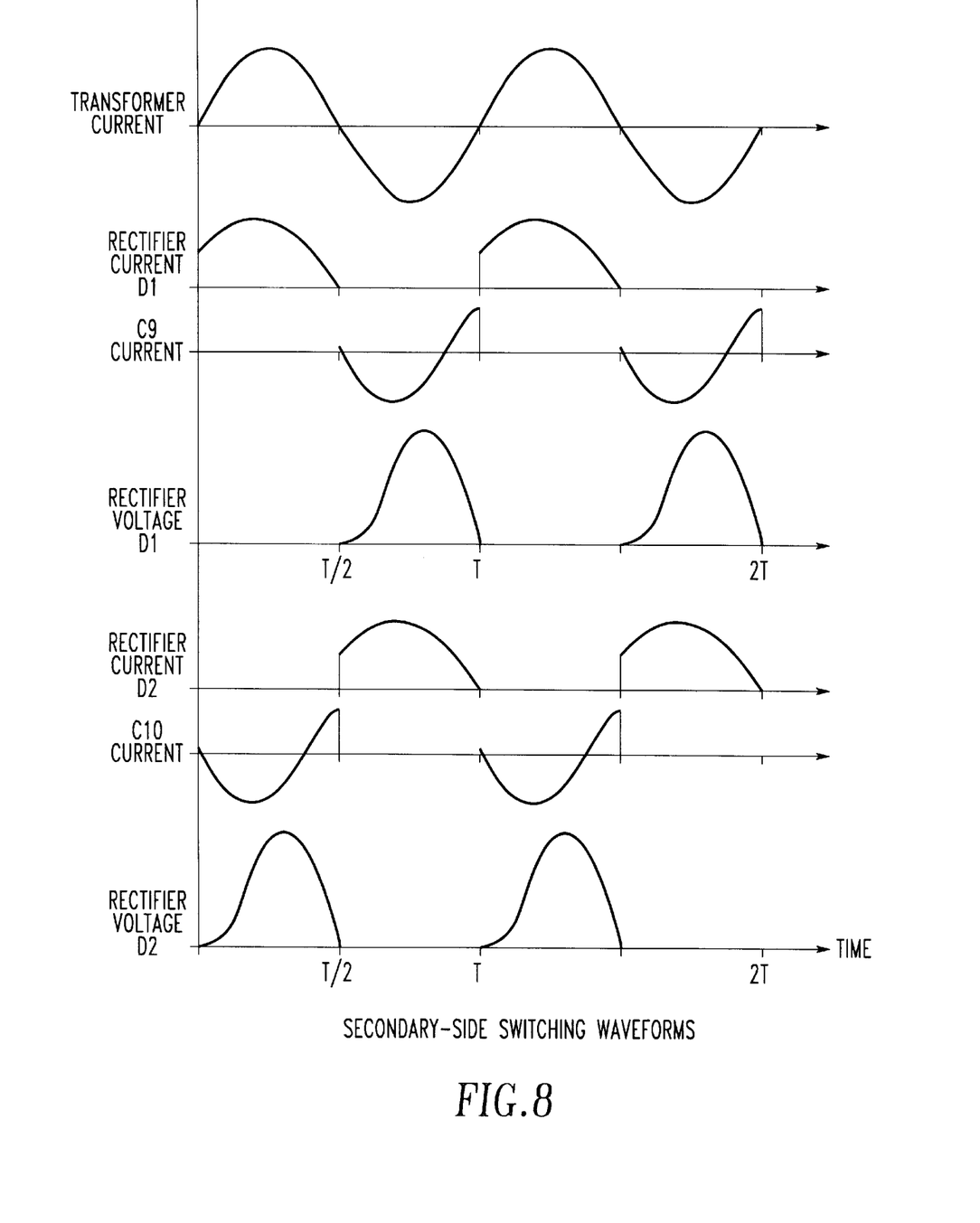

Voltage waveforms for various circuit points in the converter 100 are shown in FIGS. 7 and 8.

Figure 3:
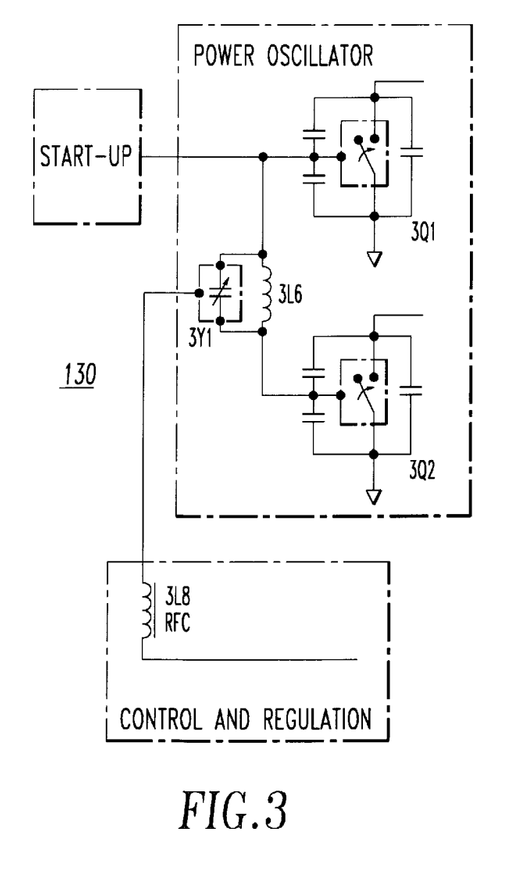
FIGS. 3–6 are circuit schematics representing additional alternative embodiments of the invention.

An alternative circuit embodiment 130 of the invention is presented in FIG. 3. In the alternative circuit 130, a varactor 3Y1 is placed in shunt with resonant inductor 3L6.

In the converter 100 of FIG. 2, the varactors 2Y1 and 2Y2 are controlled by a feedback bias signal. The output voltage is sampled at the load output and compared to a reference or setpoint signal by an error amplifier 112. The generated error signal can be isolated through an opto-coupler 114 or it may feed directly into a signal amplifier 116 which in turn feeds RF chokes 2L8 and 2L9 to bias the varactors 2Y1 and 2Y2.

As indicated, a self-oscillating DC-DC converter of the invention achieves output voltage regulation by varying the converter switching frequency in relation to fixed tuning of a resonant power tank. An alternative to varactors is presented in a converter 150 of FIG. 5. The varactors are replaced with a variable inductor configuration 151. The inductance of transformer 5T2 is operated between the self-magnetizing inductance and the leakage inductance (see an article entitled INDUCTIVE TUNED OSCILLATOR published by D. M. Nguyen in RF Design in September 1996 at pages 80–82.

Figure 5:
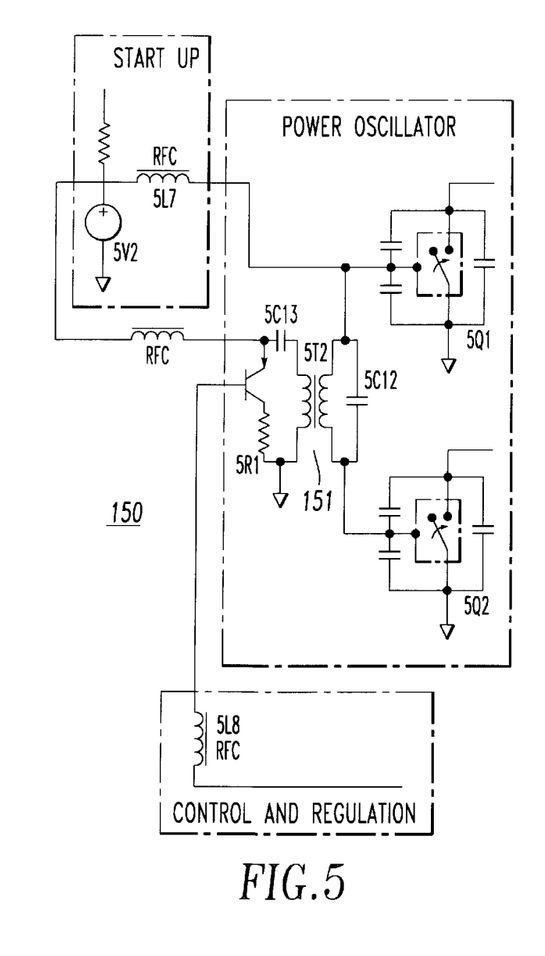

Transistor 5Q3 is controlled by a feedback bias signal from control and regulation circuitry. Along with resistor 5R1, the transistor 5Q1 provides a linear variation of the equivalent transformer inductance and, thereby, a linear variation of oscillation frequency. Capacitor 5C13 is a DC blocking capacitor. Capacitor 5C12 is placed in parallel with the transformer inductance to provide phase reversal and impedance control to the primary switches 5Q1 and 5Q2. Such capacitance can be incorporated into the design of the transformer by exploiting the self-winding capacitance.

Figure 6:
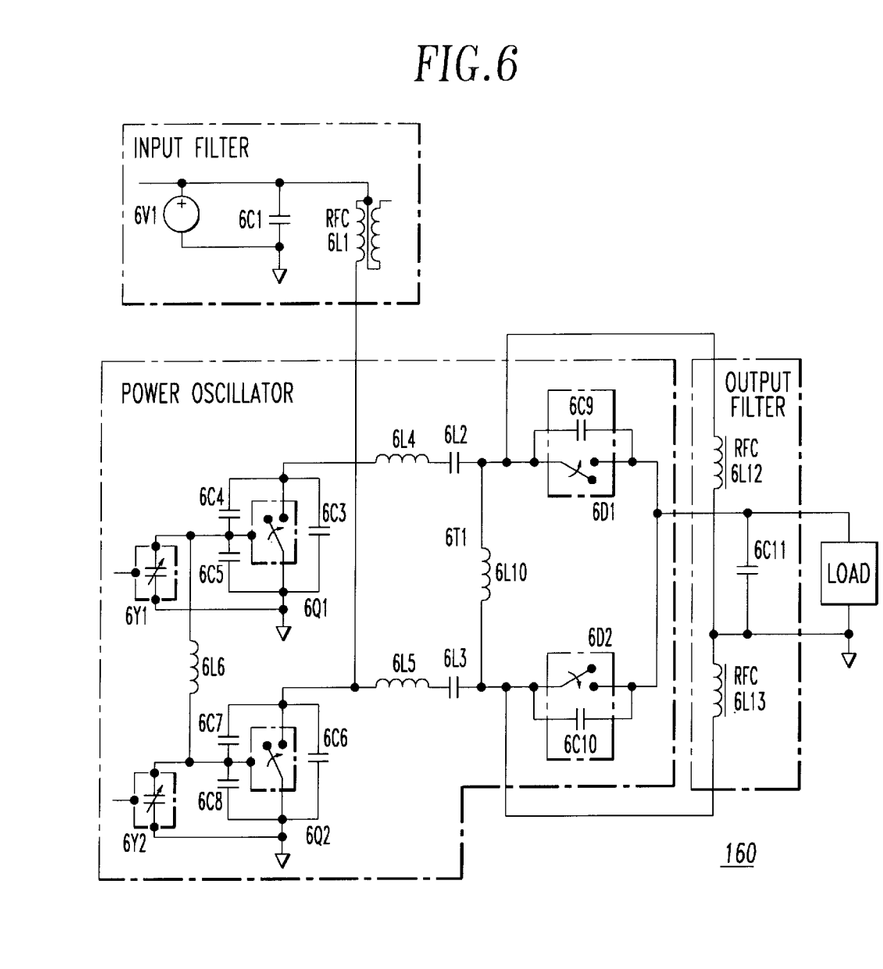

The transformer 2T1 of FIG. 2 can be replaced by alternative circuitry which provides impedance transformation. FIG. 6 presents an alternative power train implementation 160 which uses a lump element filter 6T1 to provide step-down impedance transformation. This type of impedance transformation lends itself well to printed components. This is attractive at VHF frequencies where printed inductive elements are coreless and can be printed in the substrate of a converter embodied with integrated semiconductor circuitry.

Figure 9:
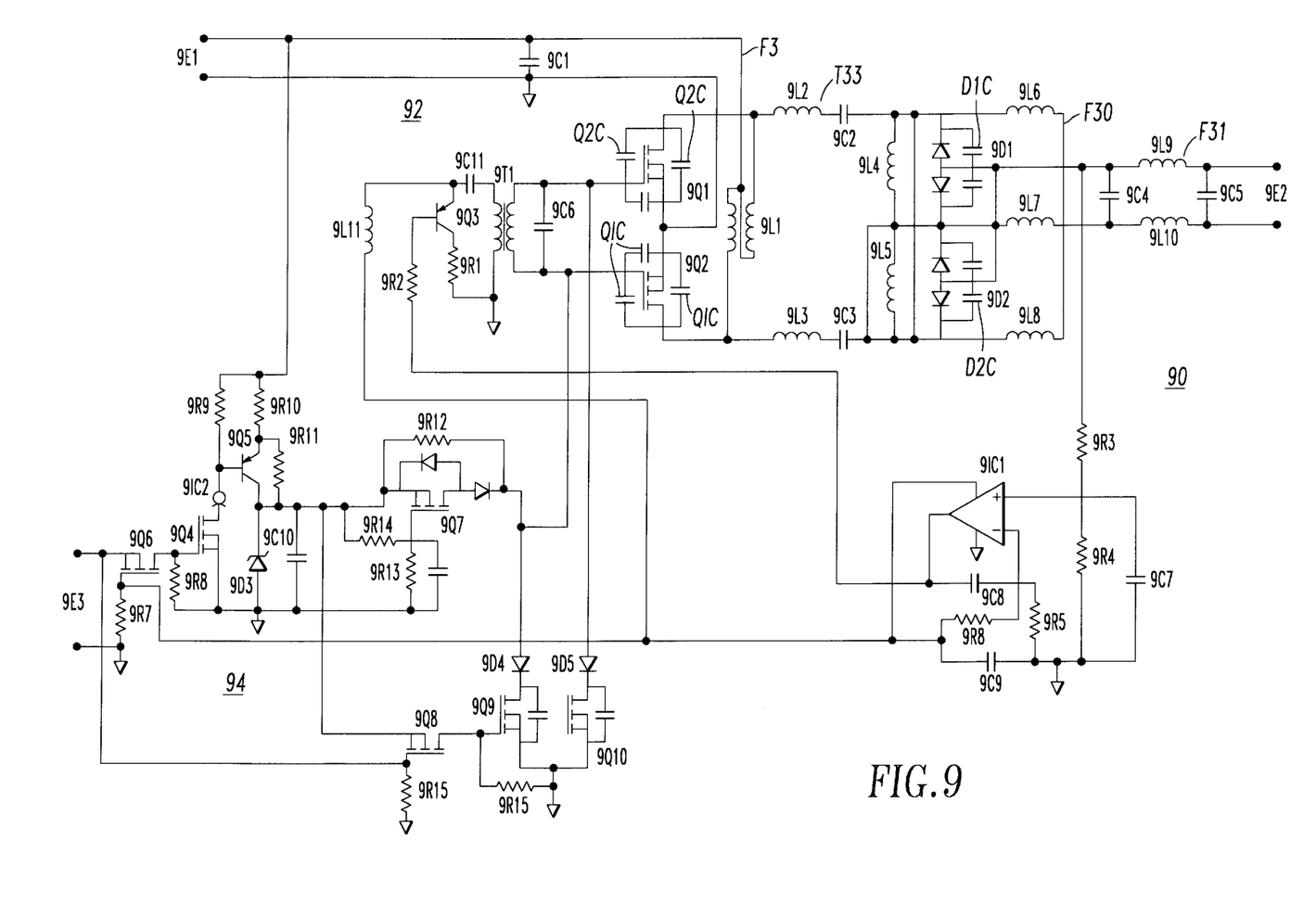
FIGS. 9 and 10 show additional detailed, practical embodiments of the invention.

A practical circuit embodiment of the invention is shown in FIG. 9. In this case, inductance is varied to control oscillator frequency, and very fast enable modulation circuitry is employed as required for radar applications.

A VHF converter 90 is applicable to a distributed radar power supply system as in the referenced 301P patent application. Generally, the converter 90 employs distributed lump elements for impedance transformation and is arranged overall to be especially adapted for VHF operation in the range of 100 MHz to 200 MHz.

A source provides an input intermediate voltage 9E1 which is converted to a voltage 9E2 for RF bias in the radar application. A practical intermediate input voltage is 50 VDC in the radar application with state-of-the-art primary switching devices. A representative output voltage for RF biasing is 8VDC to 10 VDC.

An input filter F3 includes a capacitor 9C1 and an inductor 9L1. The filter F3 feeds DC current into a primary side of a power train while attenuating AC signals on the input line. The filter inductor 9L1 preferably has a magnitude equal to five to ten times that of primary loop impedance.

In a self-oscillating, push-pull amplifier 92, transistors 9Q1 and 9Q2 are primary switching devices, preferably MOSFETS. However, other semiconductor transistors such as bipolars or SITs can be used.

Diodes 9D1 and 9D2 are rectifier devices which operate in a rectifier circuit. An interleaved, fine-line Schottky diode is suitable for use in embodying the diodes 9D1 and 9D2. An impedance transformation circuit T33 links primary switch outputs to an input of the rectifier circuit. The primary AC voltage is "stepped-down" to an AC voltage across the diodes 9D1 and 9D2 with the output DC voltage being approximately equal to the average value of the AC voltage magnitude.

9L2 and 9L3 are primary resonant inductors. 9C2 and 9C3 are resonant capacitors and serve as DC blocking capacitors. 9L4 and 9L5 are secondary resonant inductors.

Intrinsic capacitance Q1C and Q2C of primary switching devices 9Q1 and 9Q2 are functional elements in a primary resonant circuit. Intrinsic capacitance D1C and D2C of the rectification diodes D1 and D2 are functional elements in a secondary resonant circuit. These elements along with 9L2, 9L3, 9C2, 9C3, 9L4 and 9L5 form the impedance transformation circuit T33. In addition, these components along with transformer 9T1 and capacitor 9C6 represent a power oscillator which operates as a power train to create a resonant bandpass filter equivalent.

A first output filter stage F30 includes inductors 9L6, 9L7 and 9L8 and a capacitor 9C4. These inductors function as RF chokes and have an impedance magnitude five to ten times that of the secondary impedance circuitry.

A second filter stage F31 consists of inductors 9L9 and 9L10 and capacitor 9C5. The second filter stage obtains microvolt amplitude levels required for radar applications.

An error amplifier 9IC1 feeds an active variable inductor consisting of switch 9Q3, resistor 9R1 and transformer 9T1. Resistors 9R3 and 9R4 divide the converter output voltage which is compared to a reference or setpoint voltage determined by a divided resistor 9R6 and 9R5.

Capacitor 9C9 is a bypass capacitor. Capacitor 9C8 and capacitor 9C7 provide loop compensation.

9L11 is an RF choke which feeds a DC bias to transistor 9Q3. The choke 9L11 can be replaced by a resistor since the equivalent RF model for a resistor consists of a series inductance. 9R2 is a current limiting impedance.

By varying the bias voltage to the gate of the transistor 9Q3 with an error signal generated by the error amplifier 9IC1, the frequency of the power oscillator modulates to permit regulation of the output DC voltage. The converter 90 operates on the slope of a resonant bandpass of the power train.

Voltage 9E3 is applied to an enable circuit 94 to enable operation of the DC-DC converter 90 as a self oscillating unit. Resistors 9R10, 9R11 feed zener diode 9D3 and capacitor 9C10 which generates a turn-on voltage.

In turn, resistor 9R12 feeds one side of the push-pull oscillator 92, i.e., the gate of the primary switch 9Q2. The inductance of 9T1 along with the capacitance of 9C6 inverts the polarity of the startup ramp to the adjunct gate of the push-pull primary switch 9Q1.

If an enable signal is high (on state), transistor 9Q8 is off, which permits resistor 9R15 to pull transistors 9Q9 and 9Q10 off. Diodes 9D4 and 9D5 do not conduct and appear as a high impedance to the gate terminals of the primary switches 9Q1 and 9Q2. The oscillator accordingly starts.

If the enable signal 9E3 is switched low (off-state), transistor 9Q8 is turned on. The bias voltage is applied to transistors 9Q9 and 9Q10 which force diodes 9D4 and 9D5 to conduct, shorting the gates of the primary side switching transistors 9Q1 and 9Q2. The oscillator 92 accordingly turns off.

In order to accelerate the turn-on time of the oscillator switches, current injection circuitry is included in the enable circuit 94. When the enable signal 9E3 is high, transistor 9Q6 is on, thereby passing the bias to turn on transistor 9Q4. Transistor 9Q5 turns on through a current source 9IC2 and resistor 9R9, thereby reducing the effectiveness of 9R11, and sinks current into capacitor 9C10. Transistor 9Q7 is normally on and temporarily sinks current into the gate of the primary switch 9Q2.

Once the bias voltage reaches a threshold level, transistors 9Q7 and 9Q6 are turned off. Resistor 9R8 pulls the transistor 9Q4 off, and the transistor 9Q5 then turns off. The oscillation bias thus drops to a small maintenance current through resistors 9R11 and 9R12.

The drain voltage is approximately three times the input voltage. An oscillator frequency of 130 Mhz along with a filter corner frequency of 6–8 MHz permits a turn-on rise time of 50–60 ns.

Figure 10:
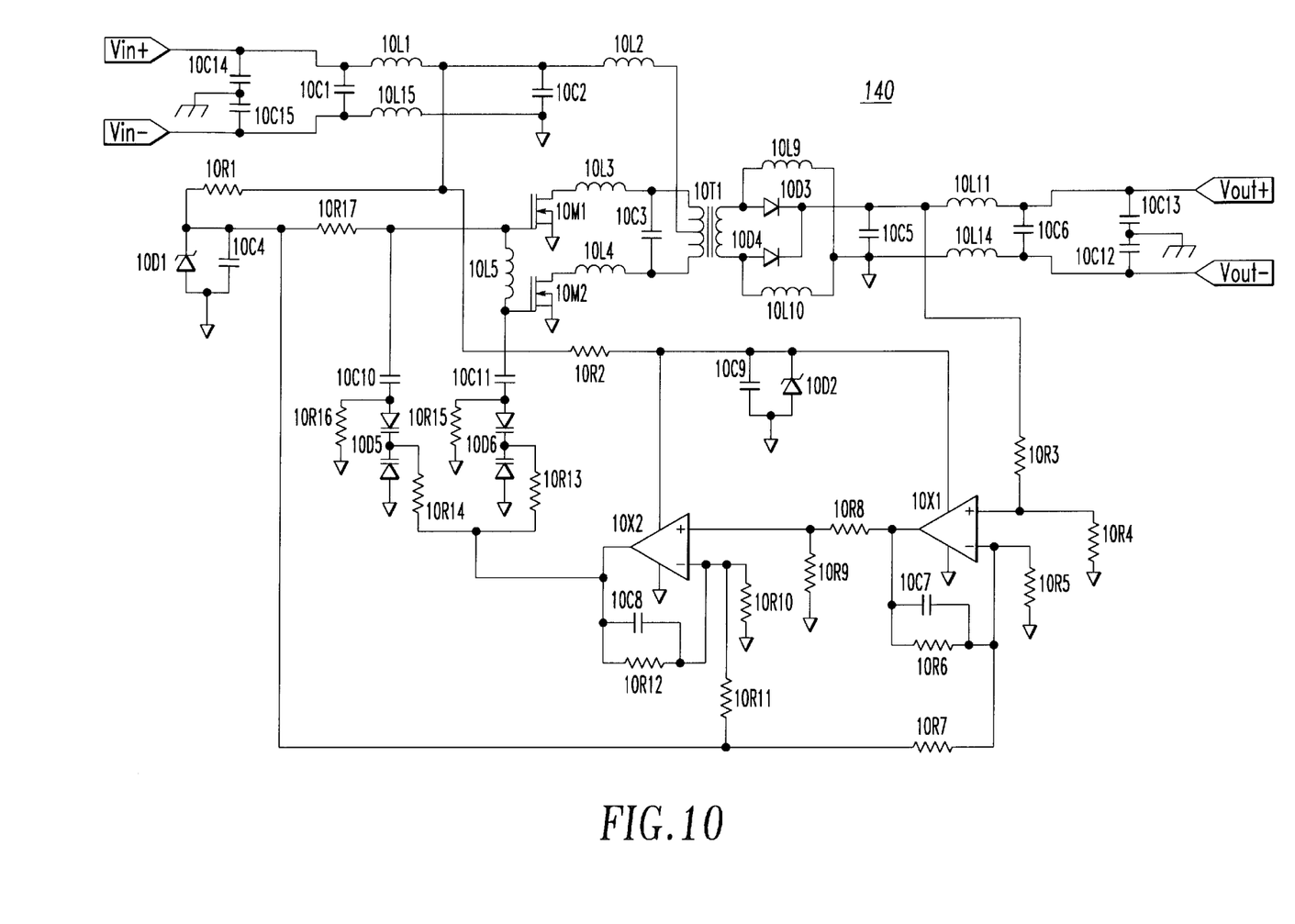

Another practical converter embodiment 140 of the invention, schematically shown in FIG. 10, is especially adapted for operation in the VHF range. A conventional transformer is employed, and varactors are used for oscillator frequency control. The converter 140 provides good operation up to at least 70 MHz.

Switches on the primary transformer side are implemented with RF power MOSFET transistors. Secondary side rectifying devices are multi-cell RF Schottky diodes. Error and signal amplifiers are implemented with dual complementary bipolar operational amplifiers for maximum slew rate. At VHF operating frequencies, RF chokes are implemented with surface mount resistors where small signals are present, i.e., 10R17 in the start-up circuitry and 10R14, 10R15 in the control/regulation circuitry.

Capacitors 10C10 and 10C12 provide DC bias block for varactors 10D5 and 10D6. Capacitors 10C14–10C15 and 10C12–10C13 represent RF EMI feed through filters.

In summary, the invention provides a self-oscillating DC-DC converter especially adaptable to VHF operation and having a number of features, as compared to prior art converters using single-ended amplifiers. Self-generated resonant switch drive and oscillation provides efficient VHF switching operation while reducing circuit interface requirements.

The push-pull, self oscillating DC-DC converter can operate over a wide frequency range including the VHF range as a result of resonant operation driven by a resonant tank in which impedance values of oscillator components, including impedance transformer and rectifier components, as well as impedance values of parasitic elements, functionally contribute to the resonant operation.

Further, higher frequency implementation, as compared to DC-DC converters using single-ended amplifiers, results from mathematical division of primary side reactance inherent to the push-pull VHF converter topology. In addition, current requirements are reduced over the single-ended-amplifier type of DC-DC converters through increased differential transformer voltage. This current reduction is particularly attractive for VHF operation due to skin depth effects.

The operation of a DC-DC converter of the invention reduces the energy storage time requirements of passive components and, thereby, magnitudes of such components. A significant reduction in size and weight is achieved.

A self-oscillating DC-DC converter of the invention can be embodied to operate over a wide frequency range including the entire VHF range, and permits the use of printed circuit board components and stripline transformation technology eliminating magnetic core material, thereby reducing costs and increasing manufacturability. In a sensitive data processing product, power supply frequency operation greater than the communication channel frequency minimizes noise/spur interference and eliminates stringent filter requirements. The push-pull, self-oscillating DC-DC converter of the invention is particularly suited for use in distributed power systems as a point-of-load converter, due to extended frequency operation with reduced size, weight and noise. Applications include implementation on avionics digital processing SEM-E cards and RADAR T/R module integration.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A DC-DC converter comprising:
   an input filter generating a filtered DC input voltage signal from an input DC voltage;
   a power oscillator having tank circuit components and other components for converting the filtered input DC voltage to an output DC voltage;
   the oscillator frequency being dependent on impedance magnitudes of the tank circuit components and magnitudes of a plurality of component intrinsic parameters; and
   circuitry including electrically variable electrical reactance circuit components responsive to the output DC voltage for controlling the oscillator frequency to regulate the output DC voltage.

2. The converter of claim 1 wherein the power oscillator includes a push-pull amplifier having at least a pair of drive switches.

3. The converter of claim 2 wherein the electrically variable electrical reactance circuit components includes variable capacitance circuitry coupled to a low-signal, control side of the drive switches.

4. The converter of claim 3 wherein the variable capacitance circuitry includes a varactor coupled to each drive switch.

5. The converter of claim 3 wherein:
   the power oscillator includes an impedance transformation circuit and a rectification circuit;
   an output of the push-pull amplifier is coupled to the impedance transformation circuit;
   the rectifier circuit is connected to an output of the impedance transformation circuit to generate the output DC voltage; and
   the drive switches are transistor elements and at least one intrinsic capacitance of each transistor element is operative as a functional contributor to the oscillator frequency.

6. The converter of claim 2 wherein the controlling circuitry includes a start-up/enable circuit coupled to a low-signal, control side of the drive switches thereby providing modulation of the converter.

7. The converter of claim 2 wherein:
   the power oscillator includes an impedance transformation circuit and a rectification circuit;
   an output of the push-pull amplifier is coupled to the impedance transformation circuit; and
   the rectifier circuit is connected to an output of the impedance transformation circuit to generate the output DC voltage.

8. The converter of claim 7 wherein:
   an output filter circuit is connected to an output of the rectifier circuit to generate an ultralow ripple output DC voltage.

9. The converter of claim 7 wherein the impedance transformation circuit includes a transformer.

10. The converter of claim 7 wherein the impedance transformation circuit includes a distributed impedance circuit.

11. The converter of claim 7 wherein the impedance transformation circuit operates as at least one tank circuit component.

12. The converter of claim 7 wherein an output choke of the impedance transformation circuit is split and functions as a current doubler for secondary currents.

13. The converter of claim 2 wherein the drive switches are transistor elements and at least one intrinsic capacitance of each transistor element is operative as a functional contributor to the oscillator frequency.

14. The converter of claim 2 wherein the drive switches generate output currents which are substantially sinusoidal.

15. A method for operating a DC-DC converter, the steps of the method comprising:
generating a filtered DC voltage for input to a power oscillator;
operating the power oscillator so that the oscillator frequency is dependent on impedance values of oscillator components and values of a plurality of component intrinsic parameters; operating the oscillator to generate an output DC voltage and
controlling the frequency of the power oscillator with active variable electrical reactance circuit components responsive to the output dc voltage.

16. The method of claim 15 wherein the oscillator includes a push-pull amplifier having a pair of drive switches, and the steps of the method further include:
controlling the low-signal side of each of the drive switches to start/modulate the converter.

17. A DC-DC converter comprising;
a power oscillator for converting an input DC voltage to an output DC voltage;
the power oscillator including a push-pull amplifier having at least a pair of drive switches, and further including an impedance transformation circuit to which an output of the push-pull amplifier is coupled;
a rectifier circuit connected to an output of the impedance transformation circuit to generate the output DC voltage; and
circuitry including active variable electrical reactance elements responsive to the output DC voltage for controlling the oscillator frequency to regulate the output DC voltage.

18. The converter of claim 17 wherein the active variable electrical reactance elements include electrically variable capacitance elements coupled to a low-signal, control side of the drive switches.

19. The converter of claim 18 wherein the electrically variable capacitance elements include a varactor coupled to each drive switch.

20. The converter of claim 17 wherein the controlling circuitry includes a startup-enable circuit coupled to a low-signal, control side of the drive switches thereby providing modulation of the converter.

21. The converter of claim 17 wherein the oscillation frequency of the power oscillator is determined by circuit parameters including component intrinsic parameters and impedances of components of the push-pull amplifier and the impedance transformation circuit.

22. The converter of claim 21 wherein the impedance transformation circuit includes a transformer.

23. The converter of claim 1 wherein the electrically variable electrical reactance circuit components include variable inductance circuitry for controlling the oscillator frequency.

24. The converter of claim 17 wherein the active variable electrical reactance elements include electrically variable inductance circuitry.

* * * * *